(12) United States Patent
Nicholson et al.

(10) Patent No.: US 12,565,347 B2
(45) Date of Patent: Mar. 3, 2026

(54) AUTOMATED SYRINGE PROCESSING STATIONS AND RELATED METHODS

(71) Applicant: ATS Corporation, Cambridge (CA)

(72) Inventors: Kenneth Wayne Nicholson, Cambridge (CA); Philip David Munroe, Cambridge (CA); Ryan David Chubb, Cambridge (CA); Philip Michael Kurtz, Cambridge (CA); Michael Tze-Chun Chow, Cambridge (CA)

(73) Assignee: ATS Corporation, Cambridge (CA)

( * ) Notice: Subject to any disclaimer, the term of this patent is extended or adjusted under 35 U.S.C. 154(b) by 0 days.

(21) Appl. No.: 18/896,320

(22) Filed: Sep. 25, 2024

(65) Prior Publication Data

US 2025/0021080 A1 Jan. 16, 2025

Related U.S. Application Data

(63) Continuation of application No. PCT/CA2023/050384, filed on Mar. 23, 2023.

(60) Provisional application No. 63/323,952, filed on Mar. 25, 2022.

(51) Int. Cl.
*B65B 3/00* (2006.01)
*G05B 19/4155* (2006.01)

(52) U.S. Cl.
CPC .......... *B65B 3/003* (2013.01); *G05B 19/4155* (2013.01)

(58) Field of Classification Search
CPC .. B65B 3/003; B65B 3/04; B65B 3/26; B65B 43/46
See application file for complete search history.

(56) References Cited

U.S. PATENT DOCUMENTS

| | | | |
|---|---|---|---|
| 7,017,622 B2 | 3/2006 | Osborne et al. | |
| 8,978,344 B2 | 3/2015 | Krauss et al. | |
| 9,466,088 B2 | 10/2016 | Perazzo et al. | |
| 9,904,281 B2 | 2/2018 | Nicholson et al. | |
| 10,018,985 B2 | 7/2018 | Nicholson et al. | |
| 10,669,049 B2 | 6/2020 | Eberhardt et al. | |
| 2014/0157731 A1* | 6/2014 | Perazzo | B65B 3/003 |
| | | | 141/2 |
| 2018/0105294 A1 | 4/2018 | Abboud et al. | |
| 2019/0009935 A1 | 1/2019 | Stultz et al. | |

OTHER PUBLICATIONS

International Search Report (ISR) & Written Opinion (WO) mailed Jun. 7, 2023 in PCT/CA2023/050384.

* cited by examiner

*Primary Examiner* — Christopher J. Besler

(57) ABSTRACT

An automated mass production process including: (a) advancing a supply carrier toward a stop position adjacent a syringe insertion station, the supply carrier holding a pre-filled syringe and the syringe insertion station including an arm, a receiving port and a driver; (b) aligning a vertical axis of the driver of the syringe insertion station with a vertical axis of the receiving port of the syringe insertion station; (c) advancing an injector body toward the receiving port in synchronization with the supply carrier to the stop position; (d) moving, by the arm, the pre-filled syringe from the supply carrier to the vertical axis of the receiving port of the syringe insertion station; (e) applying a downward force by the driver along the vertical axis to direct the pre-filled syringe into the injector body; (f) retracting the arm and the driver from the pre-filled syringe.

25 Claims, 12 Drawing Sheets

400

| | |
|---|---|
| Advancing a supply carrier toward a stop position adjacent a syringe insertion station, the supply carrier holding at least one pre-filled syringe | 402 |

↓

| | |
|---|---|
| Aligning a vertical axis of a driver of the syringe insertion station with a vertical axis of a receiving port of the syringe insertion station to form a vertical linear axis | 404 |

↓

| | |
|---|---|
| Advancing an injector body toward the receiving port in electronic synchronization with advancement of the supply carrier to the stop position | 406 |

↓

| | |
|---|---|
| Moving the at least one pre-filled syringe from the supply carrier to the vertical linear axis of the receiving port of the syringe insertion station | 408 |

↓

| | |
|---|---|
| Applying a downward force by the driver along the vertical linear axis to direct the pre-filled syringe into the injector body | 410 |

↓

| | |
|---|---|
| Retracting the arm from the pre-filled syringe | 412 |

↓

| | |
|---|---|
| Retracting the driver from the pre-filled syringe | 414 |

FIG. 12

AUTOMATED SYRINGE PROCESSING STATIONS AND RELATED METHODS

CROSS-REFERENCE TO RELATED PATENT APPLICATIONS

This application is a continuation of PCT/CA2023/050384, filed on Mar. 23, 2023, which claims the benefit of U.S. Provisional Patent Application No. 63/323,952, filed on Mar. 25, 2022. The entire contents of PCT/CA2023/050384 and U.S. Provisional Patent Application No. 63/323,952 are hereby incorporated herein by reference for all purposes.

FIELD

The present disclosure relates to methods and systems for processing elongated workpieces, such as syringes, in an automated mass production process.

BACKGROUND

U.S. Pat. No. 9,904,281 (Nicholson et al.) discloses an automated method of assembling or processing components using computer numerical controlled drives to decouple the stages of delivering components to a tool, into a series of separately programmable stages, namely, a component loading stage, a component separating stage, an accelerating stage, and a delivery stage, wherein the timing, position, speed, velocity, and acceleration of each component during each stage is selected through programming of the computer numerical controls.

U.S. Pat. No. 10,018,985 (Nicholson et al.) discloses a device, system and method of automated manufacture comprising: delivering a workpiece with a delivery device; receiving the workpiece with a receiving device, the delivering of the workpiece and the receiving of the workpiece being electronically synchronized; processing the workpiece with a processing tool while the workpiece is on the receiving device; transferring the workpiece to a completion device, the ejection of the workpiece and the transferring of the workpiece being electronically synchronized. In particular the workpiece may comprise: a platform with mounts supporting a first component in a selected orientation; and a locating surface, the method comprising: engaging and disengaging the locating surface of the workpiece with releasable connectors on the delivery device, on the receiving device and on the completion device.

SUMMARY

The following summary is intended to introduce the reader to various aspects of the applicant's teaching, but not to define any invention.

According to some aspects, a method of processing syringes in an automated mass production process includes: (a) advancing a supply carrier toward a stop position adjacent a syringe insertion station, the supply carrier holding at least one pre-filled syringe and the syringe insertion station including an arm, a receiving port and a driver; (b) aligning a vertical axis of the driver of the syringe insertion station with a vertical axis of the receiving port of the syringe insertion station to form a vertical linear axis; (c) advancing an injector body toward the receiving port in electronic synchronization with advancement of the supply carrier to the stop position; (d) moving, by the arm, the at least one pre-filled syringe from the supply carrier to the vertical linear axis of the receiving port of the syringe insertion station, wherein the arm engages an outer surface of the pre-filled syringe; (e) while the arm is in engagement with the pre-filled syringe, applying a downward force by the driver along the vertical linear axis to direct the pre-filled syringe into the injector body, wherein the driver engages an inner surface of the pre-filled syringe; (f) retracting the arm from the pre-filled syringe; and (g) retracting the driver from the pre-filled syringe.

In some examples, the arm engages the pre-filled syringe on an outer diameter of the pre-filled syringe, the outer diameter including a first outer point of the outer surface and a second outer point of the outer surface, the first outer point diametrically opposed from the second outer point.

In some examples, the driver engages the pre-filled syringe on an inner diameter of the pre-filled syringe, the inner diameter including a first inner point of the inner surface and a second inner point of the inner surface, the first inner point diametrically opposed from the second inner point.

In some examples, the at least one pre-filled syringe in (d) is, prior to moving to the receiving port of the syringe insertion station, moved vertically from the supply carrier a distance greater than a length of the pre-filled syringe.

In some examples, retracting the arm in (f) involves disengaging the pre-filled syringe and retracting the arm away from the vertical linear axis.

In some examples, retracting of the arm in (f) occurs simultaneously with the driver inserting the pre-filled syringe into the injector body.

In some examples, wherein retracting the driver in (g) involves disengaging the pre-filled syringe and moving the driver away from the pre-filled syringe along the vertical linear axis.

In some examples, the method further includes: (h) after the pre-filled syringe is loaded into the injector body, releasing the injector body from the receiving port.

In some examples, the method further includes: (i), after (d), advancing the supply carrier from the stop position.

In some examples, the method further includes repeating (a) to (i) for a plurality of subsequent supply carriers.

In some examples, a second supply carrier is advanced towards a second stop position adjacent a second syringe insertion station and a second method is carried out simultaneously on the second syringe insertion station.

According to some aspects, a method of inserting elongated workpieces in receiving assemblies in an automated mass production process includes: (a) advancing a supply carrier toward a stop position adjacent an insertion station, the supply carrier holding at least one elongated workpiece and the insertion station including an arm, a receiving port and a driver; (b) aligning a vertical axis of the driver of the insertion station with a vertical axis of the receiving port of the insertion station; (c) advancing a receiving assembly toward the receiving port in electronic synchronization with advancement of the supply carrier to the stop position; (d) moving, by the arm, the at least one elongated workpiece from the supply carrier to the receiving port of the insertion station, wherein the arm engages an outer surface of the elongated workpiece; (e) while the arm is in engagement with the elongated workpiece, applying a downward force by the driver to direct the elongated workpiece into the receiving assembly, wherein the driver engages an inner surface of the elongated workpiece; (f) retracting the arm from the elongated workpiece; and (g) retracting the driver from the elongated workpiece.

In some examples, the elongated workpiece is a pre-filled syringe.

In some examples, the receiving assembly is an injector body.

According to some aspects, an automated pass production system includes: (a) a plurality of supply carriers, each supply carrier holding at least one elongated workpiece and advanceable through a stop position; (b) an insertion station adjacent the stop position, the insertion station including an arm, a receiving port and a driver, the driver in vertical alignment along a vertical linear axis with the receiving port and the receiving port supporting a receiving assembly; and (c) a control system for synchronizing operation of the supply carriers and insertion station, the control system configured to; (i) advance a supply carrier toward a stop position in electronic synchronization with advancement of a receiving assembly to the receiving port; (ii) moving, by the arm, the at least one elongated workpiece from the supply carrier to the vertical linear axis of the receiving port of the insertion station, wherein the arm engages an outer surface of the elongated workpiece; (iii) while the arm is in engagement with the pre-filled syringe, applying a downward force by the driver along the vertical linear axis to direct the elongated workpiece into the receiving assembly, wherein the driver engages an inner surface of the elongated workpiece; (iv) retracting the arm from the elongated workpiece; and (v) retracting the driver from the elongated workpiece.

In some examples, the elongated workpiece is a pre-filled syringe.

In some examples, the receiving assembly is an injector body.

In some examples, the arm engages the elongated workpiece on an outer diameter of the elongated workpiece, the outer diameter including a first outer point of the outer surface and a second outer point of the outer surface, the first outer point diametrically opposed from the second outer point.

In some examples, the driver engages the elongated workpiece on an inner diameter of the elongated workpiece, the inner diameter including a first inner point of the inner surface and a second inner point of the inner surface, the first inner point diametrically opposed from the second inner point.

In some examples, the at least one elongated workpiece in (ii) is, prior to moving to the receiving port of the insertion station, moved vertically from the supply carrier a distance greater than a length of the elongated workpiece.

In some examples, retracting the arm in (iv) involves disengaging the elongated workpiece and retracting the arm away from the vertical linear axis.

In some examples, retracting of the arm in (iv) occurs simultaneously with the driver inserting the elongated workpiece into the injector body.

In some examples, retracting the driver in (v) involves disengaging the elongated workpiece and moving the driver away from the elongated workpiece along the vertical linear axis.

In some examples, the control system is further configured to: (vi) after the elongated workpiece is loaded into the receiving assembly, releasing the receiving assembly from the receiving port.

In some examples, the control system is further configured to: (vii), after (ii), advancing the supply carrier from the stop position.

In some examples, the control system is further configured to repeat (i) to (vii) for a plurality of subsequent supply carriers.

In some examples, a second supply carrier is advanced towards a second stop position adjacent a second insertion station and a second method is carried out simultaneously on the second insertion station.

BRIEF DESCRIPTION OF THE DRAWINGS

The drawings included herewith are for illustrating various examples of apparatuses, systems, and processes of the present specification and are not intended to limit the scope of what is taught in any way. In the drawings:

FIG. 12 is a method diagram showing the method illustrated in FIGS. 5 to 11.

DETAILED DESCRIPTION

Figure 1:
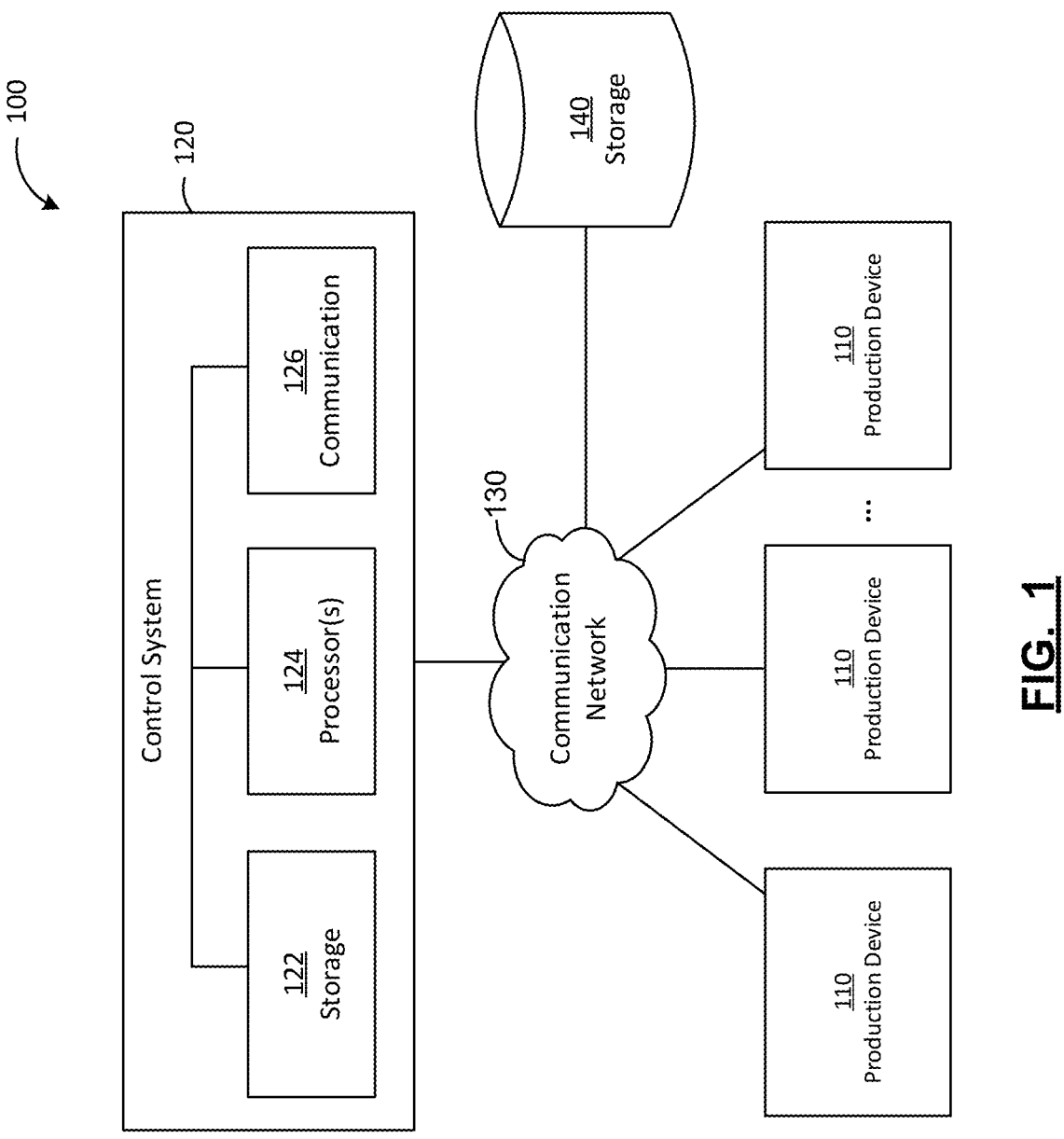
FIG. 1 is a schematic of an example automated mass production system.

Various apparatuses, systems, or processes will be described below to provide an example of an embodiment of each claimed invention. No embodiment described below limits any claimed invention and any claimed invention may cover apparatuses, processes, or systems that differ from those described below. The claimed inventions are not limited to apparatuses, systems, or processes having all of the features of any one apparatus, system, or process described below or to features common to multiple or all of the apparatuses, systems, or processes described below. It is possible that an apparatus, system, or process described below is not an embodiment of any claimed invention. Any invention disclosed in an apparatus, system, or process described below that is not claimed in this document may be the subject matter of another protective instrument, for example, a continuing patent application, and the applicants, inventors, or owners do not intend to abandon, disclaim, or dedicate to the public any such invention by its disclosure in this document.

A production process can involve processing (e.g. feeding, indexing, transferring, assembling, transporting, validating, etc.) parts to produce a product. During the production process, the part requiring further processing (for example, subcomponent, assembly, or partially finished product) can be referred to as a workpiece. The workpiece can be moved through a production system among various production devices that operate on the workpiece(s) in production of the product.

In some applications, a production process may require assembly of parts together, for example, insertion of an elongated workpiece into a receiving assembly. According to some aspects of the present disclosure, an elongated workpiece processing system can include a plurality of production devices electronically synchronized to improve efficiency of workpiece processing in a continuous mass production process. According to some aspects, the production devices of the workpiece processing system can include one or more presentation devices (e.g. feed, indexing, and/or transport devices) and one or more processing devices (e.g. pick-and-place assembly robots) operable in electronic synchronization with one another to facilitate efficient workpiece processing. According to some aspects the workpiece processing system can include a feed device for separating and delivering a leading workpiece from a stream of workpieces, an indexing device for receiving workpieces from the feed device and presenting the workpieces for processing, and a pick-and-place robot for transferring the workpieces from the indexing device to another workpiece for installation thereon. The workpiece can be held by a transport device (e.g. carrier) movable along a track for transporting the workpiece from and/or to other production devices for further processing. Operation of the feed device, indexing device, pick-and-place robot, and carrier can be electronically synchronized for improved efficiencies relative to some conventional workpiece processing systems.

Referring to FIG. 1, a schematic of an example automated production system 100 is shown. In the example illustrated, the production system 100 includes a plurality of production devices 110 for processing workpieces, a production control system 120 for controlling operation of the production devices 110 and/or other system components to facilitate a mass production process, a communication network 130 for enabling communication among system components, and a production system storage component 140 for storing relevant data for the production system 100 (e.g. operational and/or control data relating to the production devices 110 and/or other aspects of the system 100).

In the example illustrated, the control system 120 includes a control system storage component 122, one or more system processors 124, and a system communication component 126. The system processor 124 controls operation of the control system 120. In some examples, the system processor 124 and processors at the production devices 110 cooperate to control operation of the system 100 (e.g. through determination and/or processing of control parameters and generation of control signals for operation and synchronization based on the control parameters).

In some examples, the storage component 122 (e.g. memory) can store data received from the production devices 110, data for coordinating operation of the production devices 110, property data in respect of each production device 110, etc. The storage component 122 can store computer programs executable by the system processor 124 to facilitate communication among and operation of the system components.

The production system storage component 140 can be accessible via the communication network 130 and provided in addition to or in lieu of the control system storage component 122. In some examples, the control system storage component 122 can store current operating data corresponding to current operation of the control system 120 (e.g. current position, speed, velocity, and/or acceleration of tooling), and the production system storage component 140 can store data for future use. In some examples, the storage component 140 can include third party data storage. The storage component 140 can store information about the production devices 110, including operating data, profile data (e.g., servo-motor profile data), motion data (e.g., tool motion data), part/workpiece/product data, etc. Such data can be stored in the storage component 140 for subsequent retrieval by the production devices 110 and/or control system 120, for example, through download via communication network 130.

The communication network 130 can carry data to enable communication among system components (e.g. among the control system 120, production devices 110, storage component 140, and/or other devices/components), and can be a wired and/or wireless communication network. In some examples, components of the system 100 (including, for example production devices 110 and control system 120) can include wireless communication interfaces to enable wireless communication through communication network 130.

Figure 2:
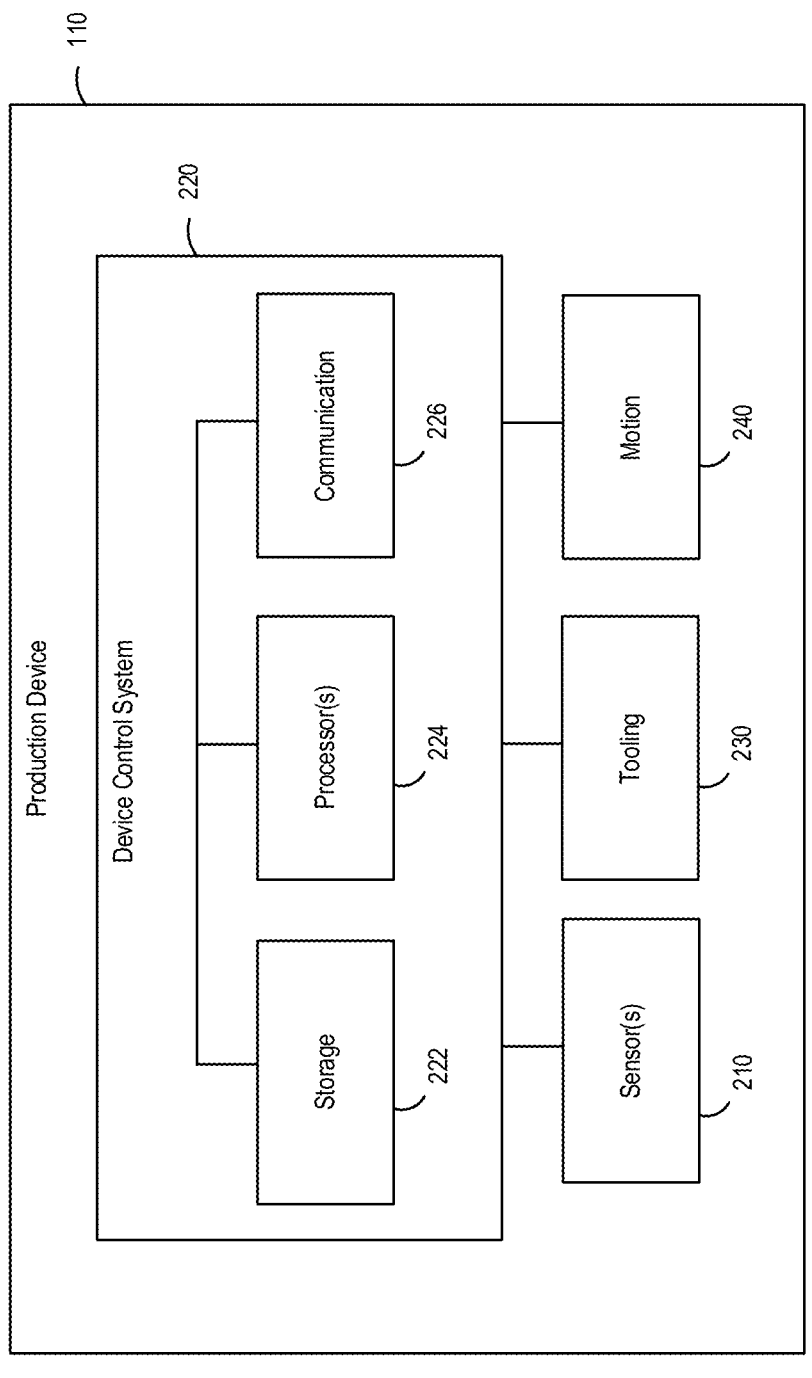
FIG. 2 is a schematic of an example production device of the system of FIG. 1.

Referring to FIG. 2, a block diagram representing an example production device 110 is shown. In the example illustrated, the production device 110 includes a device control system 220, a sensor system 210, tooling 230, and a motion system 240.

In the example illustrated, the device control system 220 includes a device processor 224, a device storage component (e.g. memory) 222, and a device communication component 226. The device control system 220 is operable to control operation of the production device 110, and can collect and store sensor, tooling, and motion data for the production device 110 in the device storage component 222 for operational use and/or for providing to the control system 120 through network 130 to facilitate electronic synchronization of production devices 110.

The device storage component 222 can store data for operation of the production device 110 and/or to facilitate electronic synchronization. Example data can include, for example, operating data, part data, tool data, motion data, sensor data, etc. The sensor system 210 can include one or more sensors (e.g. range-finding, motion, vision systems, etc.) for collecting operational and/or environmental data for facilitating the production process. Each production device 110 can be equipped with a motion system 240 for movement of the production device 110 and/or components thereof (e.g. sensors, tooling, etc.). The motion system 240 can include, for example, one or more servo-motors and/or other actuators.

The production devices 110 can be equipped with tooling 230 for engaging with and processing workpieces. Tooling 230 can be used for, for example, part handling, manipulation, transport, etc. The operation of tooling 230 can be controlled by the device control system 220 based on, for example, sensor data from the sensor system 210 and operational data for the production device 110 or other production devices 110 and/or system components.

The tooling 230 can be in the form of, for example, one or more workpiece presentation tools for presenting the workpieces at predetermined locations for delivery and/or further processing and/or one or more workpiece processing tools for performing value-added operations on the workpieces. The workpiece presentation tools can be part of, for example, one or more transports, carriers, conveyors, screws, indexer, actuators, or other devices for, for example, separating a lead workpiece from other workpieces and delivery to another presentation and/or processing tool for subsequent processing. In some examples, the presentation tools can be part of a feed device and configured to, for example: load a workpiece at a delivery position at a leading end of a stream of like workpieces; separate the workpiece at the delivery position from the other workpieces; accelerate the workpiece; and deliver the workpiece at a predetermined delivery time, delivery position, delivery speed, and moving along a delivery trajectory. The workpiece presentation tool can be configured to deliver workpieces before loading one or more subsequent workpieces at the delivery position. In some examples, the workpiece presentation tools can be part of an indexing device and configured to, for example: receive one or more workpieces at a loading position (e.g. from a feed device); accelerate workpieces toward an unloading position; and present the workpieces at the unloading position for further processing. In some examples, the workpiece presentation tools can be part of a transport device and configured to, for example, receive one or more workpieces, accelerate the workpieces toward a stop position (e.g. along a transport track) for a processing station, and present the workpieces at the processing position for processing by a processing tool.

Processing tools can be configured to conduct one or more value-added operations on or with the workpieces. For example, the processing tools can be configured to manipulate a workpiece, assemble two or more workpieces together, reorient a workpiece for further processing, etc. In some examples, processing tools can include, e.g. end effectors such as manipulators and/or grippers for part manipulation and/or assembly. In some examples, the processing tools can be part of a pick-and-place robot and can be configured to, for example, receive one or more workpieces from a workpiece presentation tool (e.g. of an indexing device); move the workpiece toward a processing position; and process the workpiece at the processing position (e.g. install the workpiece onto another workpiece presented adjacent the processing position, for example, by a transport device).

Machine-readable instructions stored in storage component 222 (or in storage 122, 140) can cause the device control system 220 (and/or 120) to execute various methods disclosed herein including generation of one or more signals (e.g., output data) useful in operation of the production devices 110. Such machine-readable instructions can be incorporated into one or more computer program products which can be stored on suitable medium or media. In some embodiments, the machine-readable instructions can be executable by processor 224 and/or 124 for generation of signals useful in electronic synchronization of two or more operations carried out by the tooling 230 (e.g. by presentation and processing tools) of the production devices 110. The machine-readable instructions can be executable by the processor(s) for determination and/or selection of control parameters for operation of the tooling 230 and generate signals representative of the control parameters. For example, the machine-readable instructions can be configured to cause processor 224 and/or 124 to generate signals useful in the electronic synchronization of the delivery of workpieces by a workpiece presentation tool and receipt of the workpieces by a processing tool.

The synchronization of two or more operations performed by the tooling 230 of one or more production devices 110 can utilize electronic camming (e.g. instead of mechanical cams, gears, or linkages). In various embodiments, the use of such electronic synchronization can facilitate system flexibility and improve system performance relative to some more-conventional systems utilizing mechanical synchronization means. In some examples, storage component 222 (and/or 122, 140) can hold data representative of one or more cam profiles to be used in the operation of the tooling 230 of one or more production devices 110. For example, such cam profile(s) can be in tabular form and can include corresponding positions representative of synchronized trajectories to be followed by the tooling 230 during operation. In some examples, one tooling component 230 can be operated as a master device and another tooling component 230 can be operated as a slave device executing movements based on the execution of movements by the master device in order to substantially maintain synchronization between the slave device and the master device. In some examples, the production devices 110 can include one or more master devices and one or more respective slave devices. For example, multiple slave devices can be electronically cammed with a master device.

The machine-readable instructions can be configured to cause processor 224 and/or 124 to generate signals useful in electronic synchronization (e.g. camming) of the delivery of a workpiece by a presentation tool and of receipt of the workpiece by a processing tool (or another presentation tool). In some embodiments, the machine-readable instructions can be configured to cause the processor(s) to generate signals useful in electronic synchronization of loading, separation, acceleration, and delivery of a workpiece by a presentation tool and of receipt of the workpiece by a processing tool. In some examples, the machine-readable instructions can be configured to cause the processor(s) to generate signals useful in controlling movement of a workpiece along a delivery trajectory and controlling movement of a processing tool along a processing tool trajectory for electronic synchronization of the workpiece and processing tool.

In some examples, the machine-readable instructions can be configured to cause processor 224 and/or 124 to generate signals useful in controlling at least some aspect of the processing of a workpiece. For example, such processing can include one or more value-added operations that can be carried out by the processing tool. Such value-added operation can include, for example, assembly of two or more workpieces together through installation of one workpiece on another workpiece. The machine-readable instructions may, for example, be configured to cause the processor(s) to generate signals useful in electronic synchronization of the processing of a workpiece and one or more operations associated with presentation and/or processing tools. In some examples, one or more operations conducted by the presentation or processing tools can be under binary control rather than direct electronic synchronization. In some examples, the triggering of an operation via a binary control signal can be dependent on the position of a master device and can still be based on a cam profile. The production devices 110 can include one or more servo-motors associated with tooling components 230, and the machine-readable instructions can be configured to cause processor 224 and/or 124 to generate signals useful in controlling the servo-motors according to a predetermined cam profile to carry out electronically synchronized operations according to the methods herein.

The production devices 110 can include a numerically synchronized control architecture. For example, transfer and presentation of workpieces (e.g. by presentation tools) according to the methods disclosed herein can include a first computer numerically controlled operation and the receiving of the workpiece (e.g. by a processing tool or another presentation tool) can include a second computer numerically controlled operation. In some examples, the loading, separating, accelerating, and delivering of workpieces can include a first computer numerically controlled operation and the receiving of the workpieces can include a second computer numerically controlled operation. In some examples, the receiving of a workpiece can include a first computer numerically controlled operation and the processing of the workpiece can include a second computer numerically controlled operation. In such examples, the first computer numerically controlled operation and the second computer numerically controlled operation can be electronically synchronized (e.g. electronically cammed).

Figure 3:
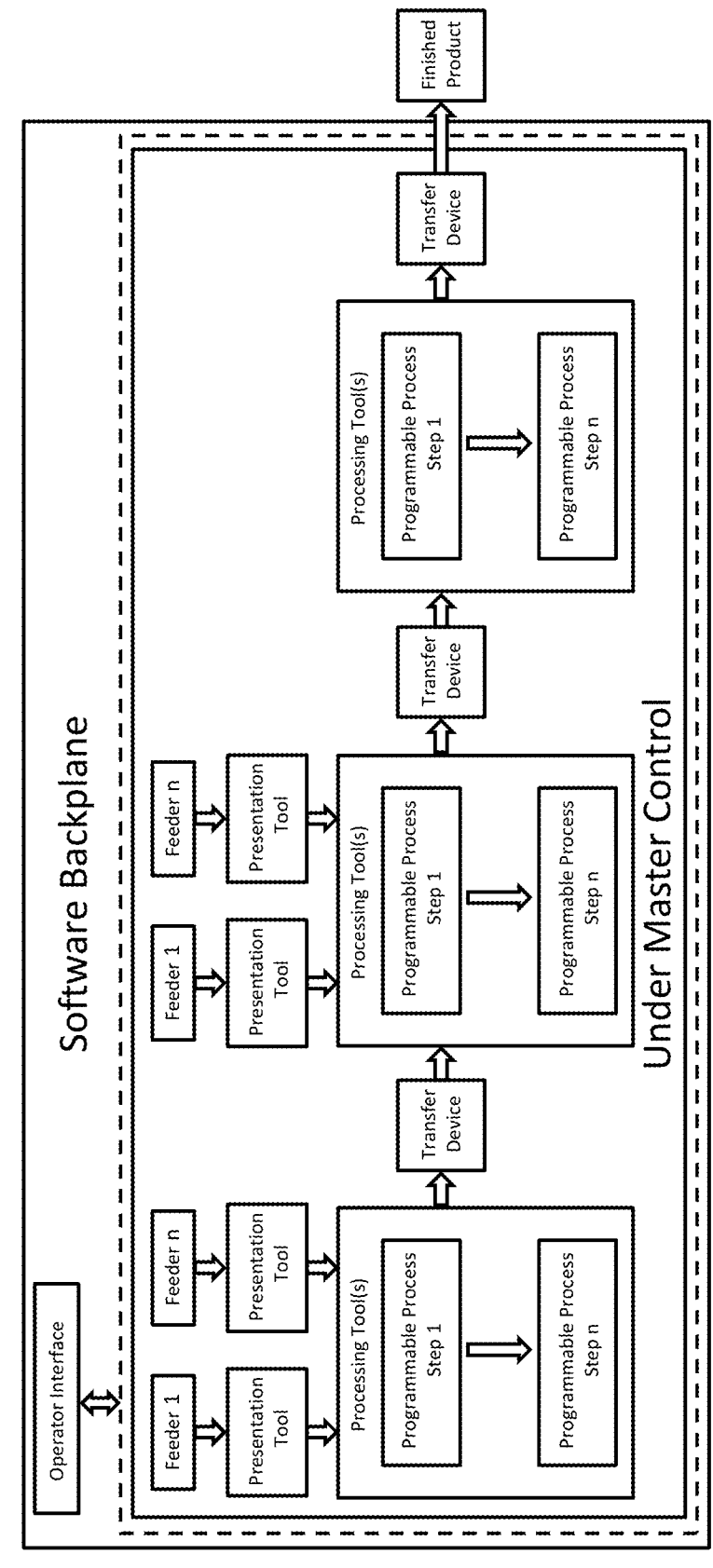
FIG. 3 is a schematic of an example implementation of the system 100 of FIG. 1.

Referring to FIG. 3, an example implementation 100*a* of the system 100 is shown schematically. The example system 100*a* can be configured to carry out steps from processes disclosed herein. System 100*a* can receive workpieces and/or raw materials as inputs; progressively add value to them via processing tools; and discharge them either as discrete finished products, as unfinished products, or as rejected scrap (i.e., defective products).

As shown in FIG. 3, system 100*a* can receive the workpieces and/or materials from one or more feeders (e.g. of a feed device) for delivering workpieces and/or materials to another presentation tool (e.g. of an indexing device). The delivery from the feeders can be done directly or via a respective buffer. Each presentation tool or transfer device (e.g. workpiece carrier) of the system 100*a* can be numerically controlled and configured to deliver the materials and/or workpieces to one or more processing tools (e.g. of a processing device). Each processing tool can add value to a workpiece and/or material via one or more programmable process steps. A given processing tool can operate in parallel to and/or in series with one or more other processing tools and/or presentation tools. Once the workpiece passes through a final processing tool, it can be discharged either as a successfully completed and validated finished product, as an unfinished product, or as rejected scrap. Human interaction with system 100*a* can be through an operator interface.

The system can include validation stations including validation devices configured to conduct inspections, checks, and/or tests on one or more of the workpieces. The validation stations can be located at, for example, one or more feeders, presentation tools, transfer devices, and/or processing tools. At these points, workpieces can be eliminated from the system as scrap if they do not meet one or more predetermined inspection criteria. Validation stations can be configured to conduct inspection, check, and/or test operations on one or more of workpieces that can be electronically synchronized with other devices, such as, for example, a master device of the production devices 110.

The various elements described above can be controlled at least in part by software resources known as base software backplane. The backplane can be configured to permit various elements of the system to carry out various control functions including: management of inputs and outputs; management of local control tasks, including programmable process steps within processing tools and local inspection tasks within validation stations; communications between different elements in the system and communication with a human user via the operator interface.

The system 100*a* can include a numerically synchronized control architecture. In various embodiments, the feeders, presentation tools, processing tools, and transfer devices can be numerically controlled. Movement of workpieces and materials through the system can occur along programmable axes of motion, which can be either rotary or linear. Movement of tooling associated with the programmable process steps of processing tools can also take place along programmable linear and/or rotary axes of motion.

An example of production devices 110 of the system 100 can include a transport track supporting a plurality of carriers. Each carrier can include a pallet configured for holding at least one workpiece and can be movably along the track (e.g. through one or more servo-drives) among a plurality of processing stations. Each processing station can include one or more production devices that can be operable in electronic synchronization with each other, the carriers, and/or production devices of other processing stations for processing the workpieces.

The processing stations can include a first processing station for transferring one or more workpieces to each carrier and a second processing station for delivering and installing one or more parts (e.g. syringes) onto the receiving assemblies (e.g. injector bodies) to form a workpiece assembly held by the second processing station. The processing stations can further include a third and fourth processing station for delivering and installing other product parts that can be held in the carrier. A fifth process station can be included for validating, testing, and/or inspecting (and/or performing some other operation) on the workpiece assemblies held by the processing stations. The processing stations can also include a sixth processing station for removing the workpiece assemblies from the processing stations for discharge from the system 100, either as a successfully completed and validated finished product, as an unfinished product, or as a rejected defective product.

The system 100 as described above is configured for installation of elongated workpieces (e.g. syringes) into receiving assemblies (e.g. injector bodies), and the second processing station can include a syringe insertion station for processing the syringes (e.g. to install the syringes into corresponding injector bodies). In some embodiments, one or more of the syringes can be pre-filled with liquids.

Figure 4:
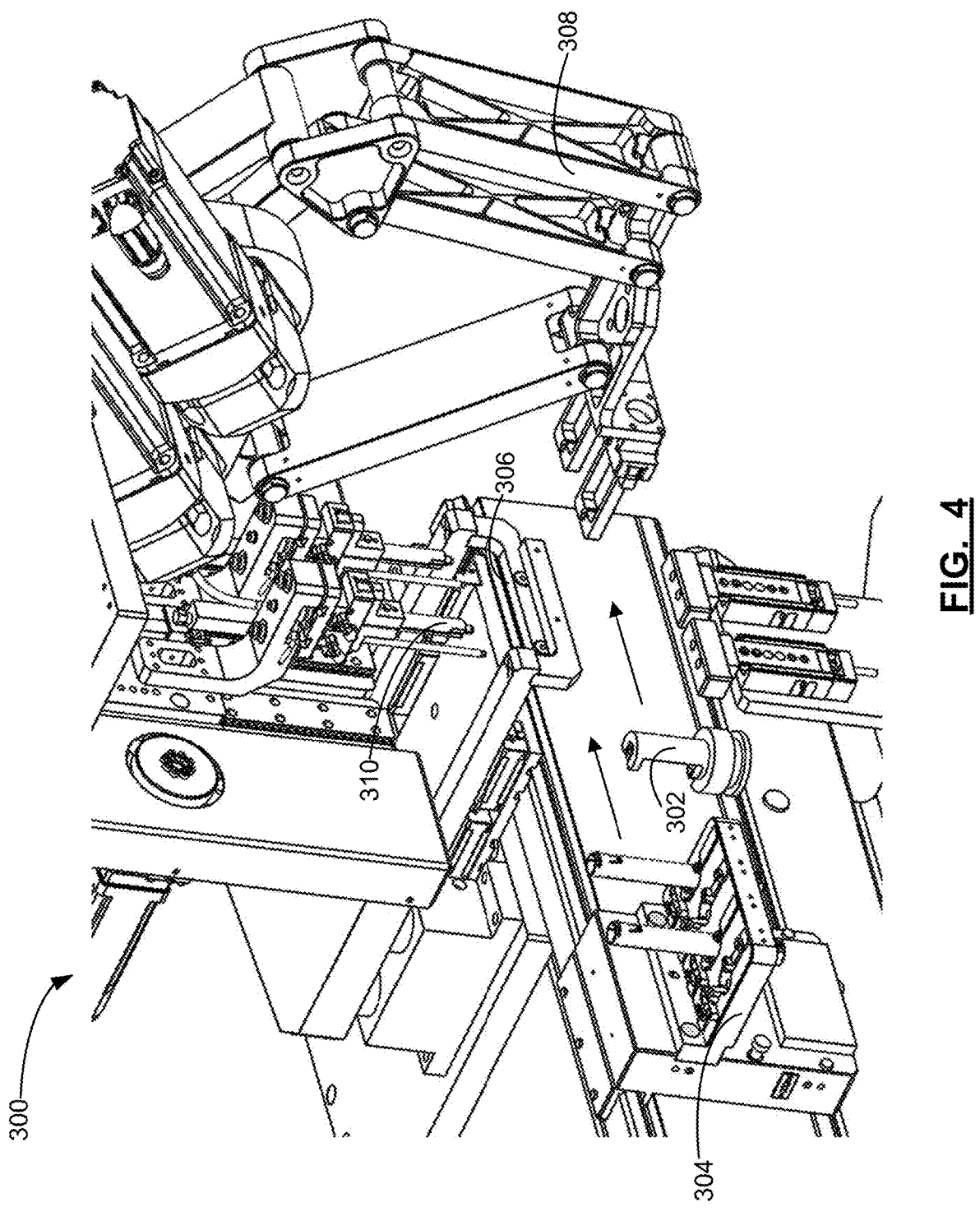
FIG. 4 is a perspective view of an example processing station of the system of FIG. 1.

Referring now to FIG. 4, an example syringe insertion station 300 (e.g. for use as the second processing station in the system 100 as described above) is illustrated. The syringe insertion station 300 can include a plurality of production devices in electronic synchronization to facilitate efficient processing of the syringes. In the example illustrated, the production devices 110 of the station 300 include a supply carrier 302 for carrying a syringe or a pre-filled syringe to a stop position. The supply carrier 302 can be a puck, a pallet, or any other carrying method. The production devices 110 can further include a transportation device 304 for advancing an injector body to a receiving port 306 of the syringe insertion station 300, a pick-and-place robot 308 for transferring the syringe from the supply carrier 302 to the syringe insertion station 300 for installation, and a driver 310 for inserting the syringe into an injector body.

In the example illustrated, the supply carrier 302 advances to a stop position located adjacent the syringe insertion station 300 along the direction shown in FIG. 4. The injector body 340 is advanced toward the receiving port 306 along the direction shown in FIG. 4 in electronic synchronization with the advancement of the supply carrier 302 to the stop position. The injector body 340 can be transported to the receiving port 306 by the transportation device 304.

Figure 5:
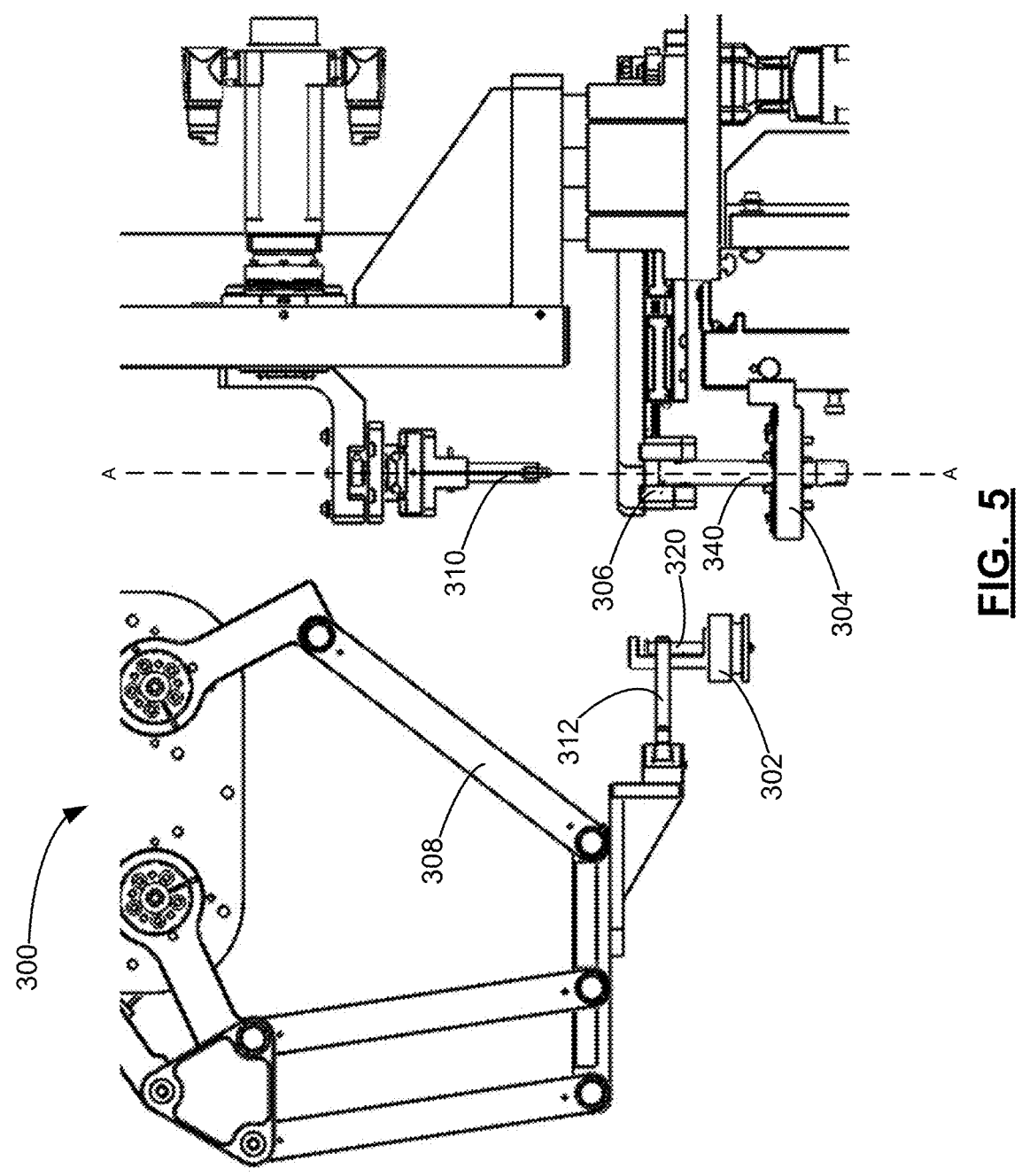
FIGS. 5 to 8 are side views of the example processing station of FIG. 4, showing movement of an elongated workpiece from a supply carrier to the syringe insertion station.

Referring to FIG. 5, in the example illustrated, the driver 310 and the receiving port 306 of the syringe insertion station 300 are aligned along vertical axis A-A. The supply carrier 302 is located at the stop position adjacent to the syringe insertion station 300. The injector body 340 is in vertical alignment with the receiving port 306 along vertical axis A-A. The injector body 340 can remain located within the transportation device 304.

In the example illustrated, the pick-and-place robot 308 includes an arm 312 to contact the pre-filled syringe 320 and move the pre-filled syringe 320 from the supply carrier 302 to the vertical axis A-A of receiving port 306. The arm 312 moves into position to engage the pre-filled syringe 320 within the supply carrier 302 along an outer surface of the pre-filled syringe 320. The outer surface can include a first outer portion, such as a first outer point, and a second outer portion, such as a second outer point, the first outer point being diametrically opposed from the second outer point and the first and second outer points forming an outer diameter of the pre-filled syringe 320. The arm 312 can engage the pre-filled syringe 320 on the outer diameter of the pre-filled syringe 320. The arm 312 can engage the pre-filled syringe 320 on the outer diameter using outer diameter grippers. Outer diameter grippers can include a first gripper to contact the first outer point and a second gripper to contact a second outer point. The outer diameter grippers can be placed around the pre-filled syringe 320 at a larger diameter than that of the pre-filled syringe 320 outer diameter and once located around the pre-filled syringe 320, contract inwardly to contact the outer points of the pre-filled syringe 320 and create a pressure grip on the pre-filled syringe 320.

Figure 6:
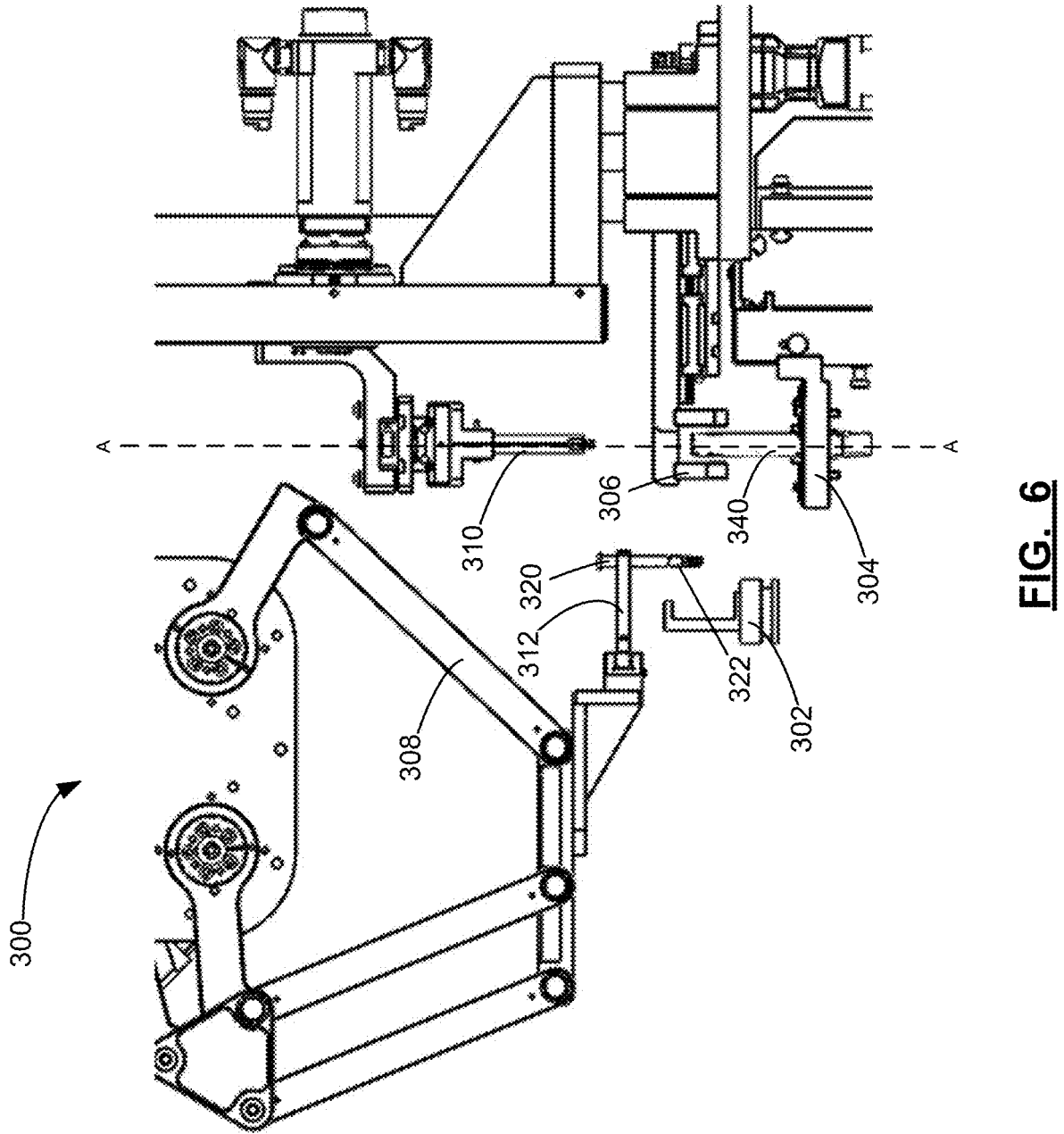

Referring now to FIG. 6, in the example illustrated, the arm 312 engages the outer surface of the pre-filled syringe 320 and moves the pre-filled syringe 320 toward the vertical axis A-A of the receiving port 306, the injector body 340 and the driver 310. In some embodiments, the arm 312 can first move the pre-filled syringe 320 vertically from the supply carrier 302 a distance greater than the length of the flange 322 of the pre-filled syringe 320. In some embodiments, the arm 312 can first move the pre-filled syringe 320 vertically from the supply carrier 302 a distance greater than the length of the pre-filled syringe 320. The vertical movement can allow the pre-filled syringe 320 to clear any barriers in the supply carrier 302 prior to being moved to the receiving port 306. In some embodiments, the arm 312 can move the pre-filled syringe diagonally away from the supply carrier 302 while exerting a slight pressure to disengage the pre-filled syringe 320 from the supply carrier 302.

As shown in the example illustrated in FIG. 6, the pre-filled syringe 320 has been disengaged from the supply carrier 302 by the arm 312 and has partially completed the movement from the supply carrier 302 to the receiving port 306.

Figure 7:
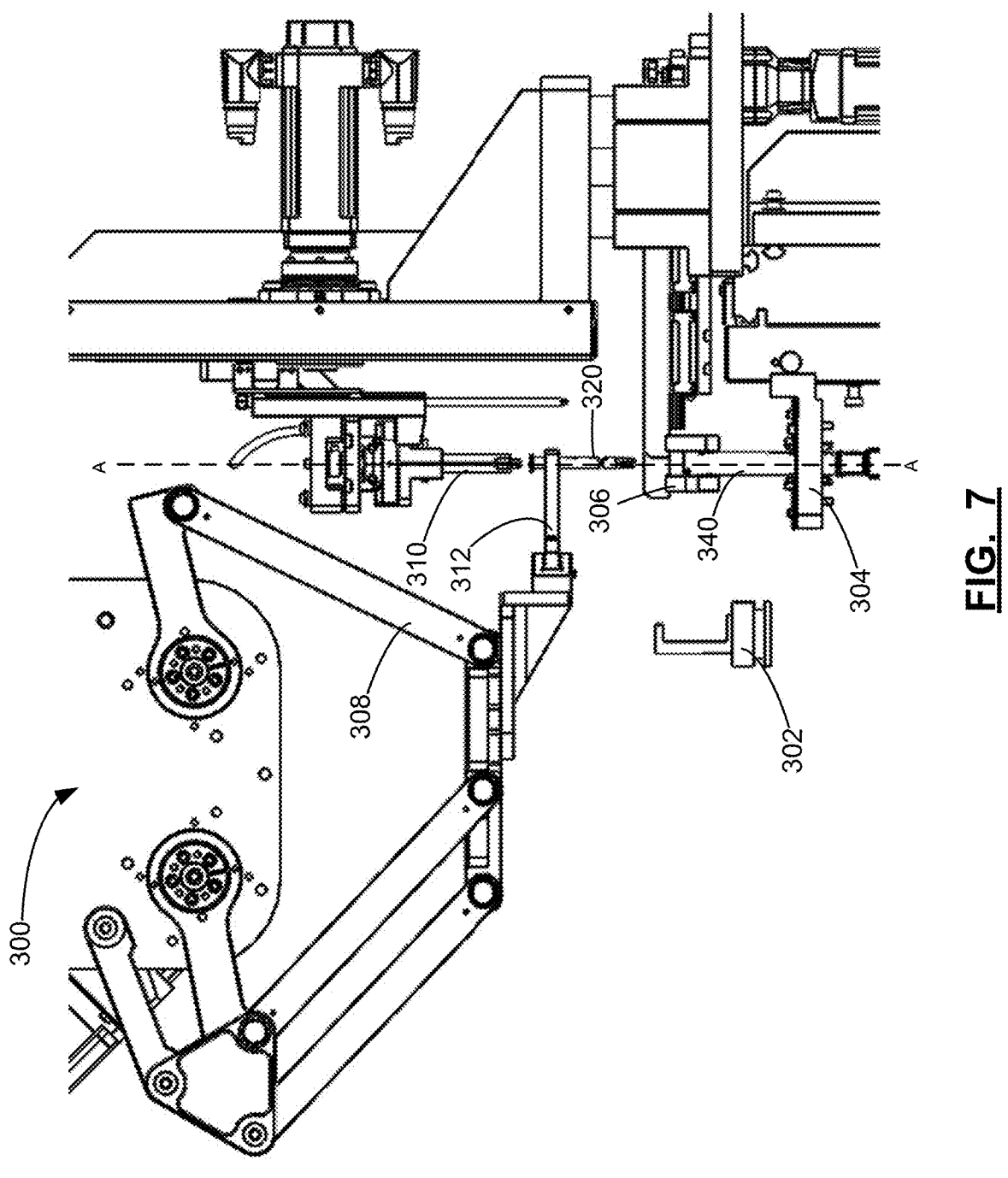

Referring to FIG. 7, in the example illustrated, the arm 312 of the pick-and-place robot 308 moves the pre-filled syringe 320 in vertical alignment with the receiving port 306, the injector body 340 and the driver 310 along vertical axis A-A.

Figure 8:
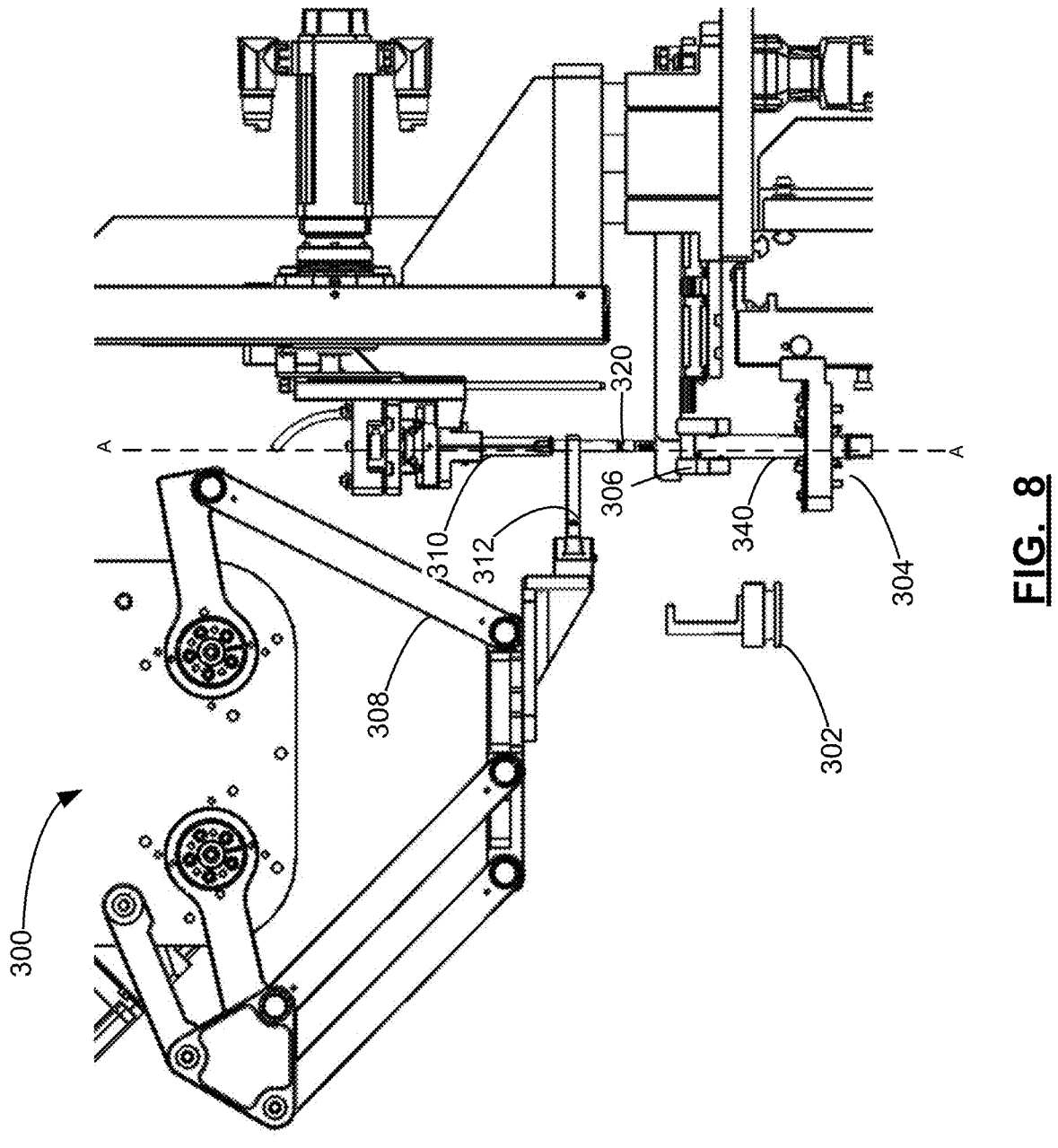

Referring to FIG. 8, in the example illustrated, the driver 310 applies a downward force along the vertical axis A-A to the pre-filled syringe 320 to direct the pre-filled syringe 320 into the injector body 340. The driver 310 engages the pre-filled syringe 320 along an inner surface of the pre-filled syringe 320. The inner surface can include a first inner point and a second inner point, the first inner point being diametrically opposed from the second inner point and the first and second inner points forming an inner diameter of the pre-filled syringe 320. The driver 310 can engage the pre-filled syringe 320 on the inner diameter of the pre-filled syringe 320. The driver 310 can engage the pre-filled syringe 320 on the inner diameter using inner diameter grippers. Inner diameter grippers can include a first gripper to contact the first inner point and a second gripper to contact a second inner point. The inner diameter grippers can be inserted into the pre-filled syringe 320 at a smaller diameter than that of the pre-filled syringe 320 inner diameter and once inside the pre-filled syringe 320, expand outwardly to contact the inner points of the pre-filled syringe 320 and create a pressure grip on the pre-filled syringe 320.

The arm 312 of the pick-and-place robot 308 can remain in contact with the pre-filled syringe 320 while the driver 310 applies the downward force, and the arm can therefore move downward in synchronicity with the driver 310. The driver 310 engaging the pre-filled syringe 320 along the inner surface while the arm 312 engages the pre-filled syringe 320 along the outer surface allows for each component, the driver 310 and the arm 312, to simultaneously contact the pre-filled syringe 320 during insertion into the injector body 340.

Figure 9:
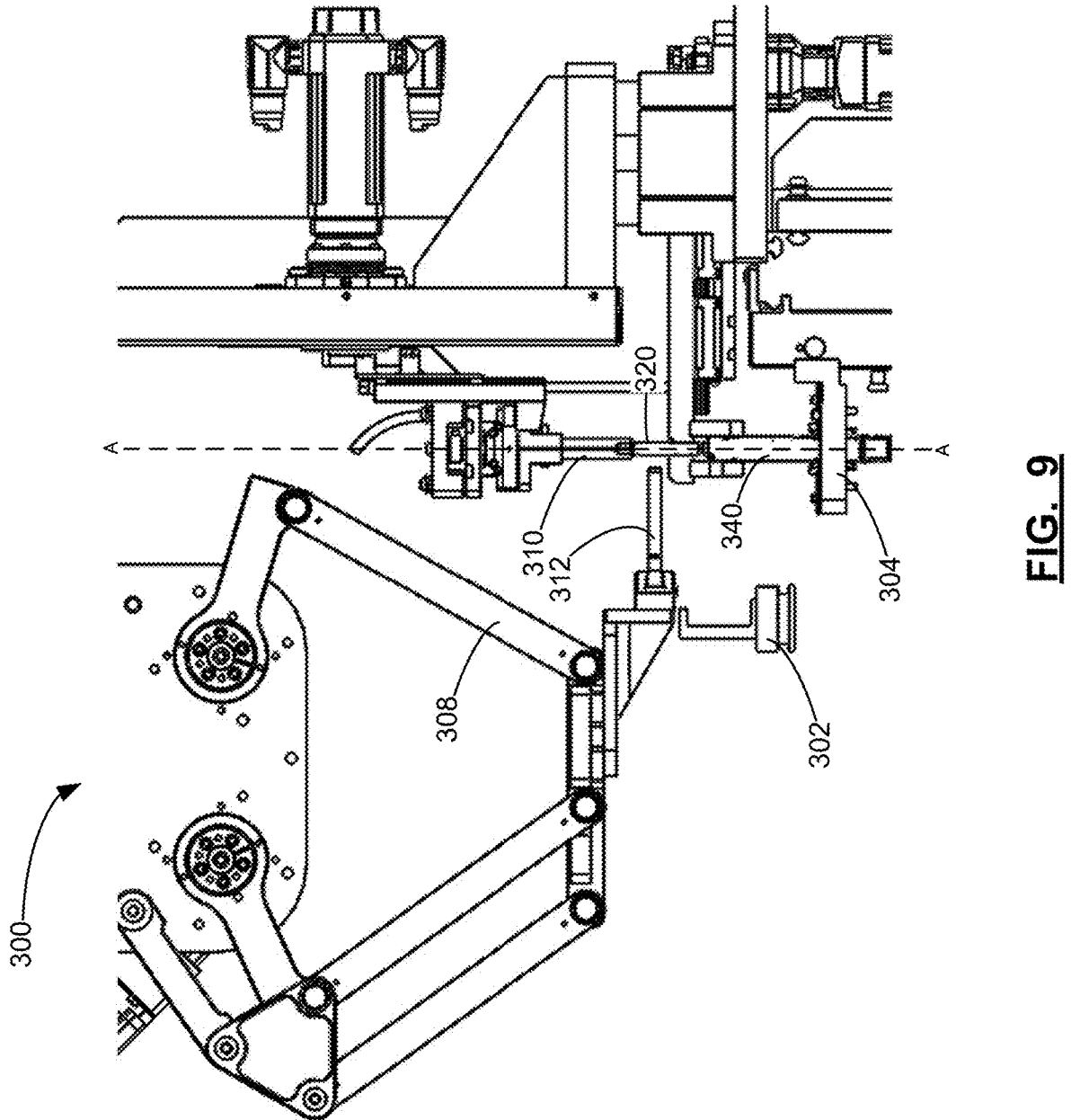
FIGS. 9 to 11 are side views of the example processing station of FIG. 4, showing insertion of the elongated workpiece into a receiving assembly.

Referring to FIG. 9, the outer diameter grippers of the arm 312 of the pick-and-place robot 308 can disengage the pre-filled syringe 320 by expanding radially and the arm 312 can move away from the pre-filled syringe 320 and the driver 310. The driver 310 can simultaneously, while the arm 312 is disengaging and moving away, continue to insert the pre-filled syringe 320 into the injector body 340 using a downward force along vertical axis A-A.

Figure 10:
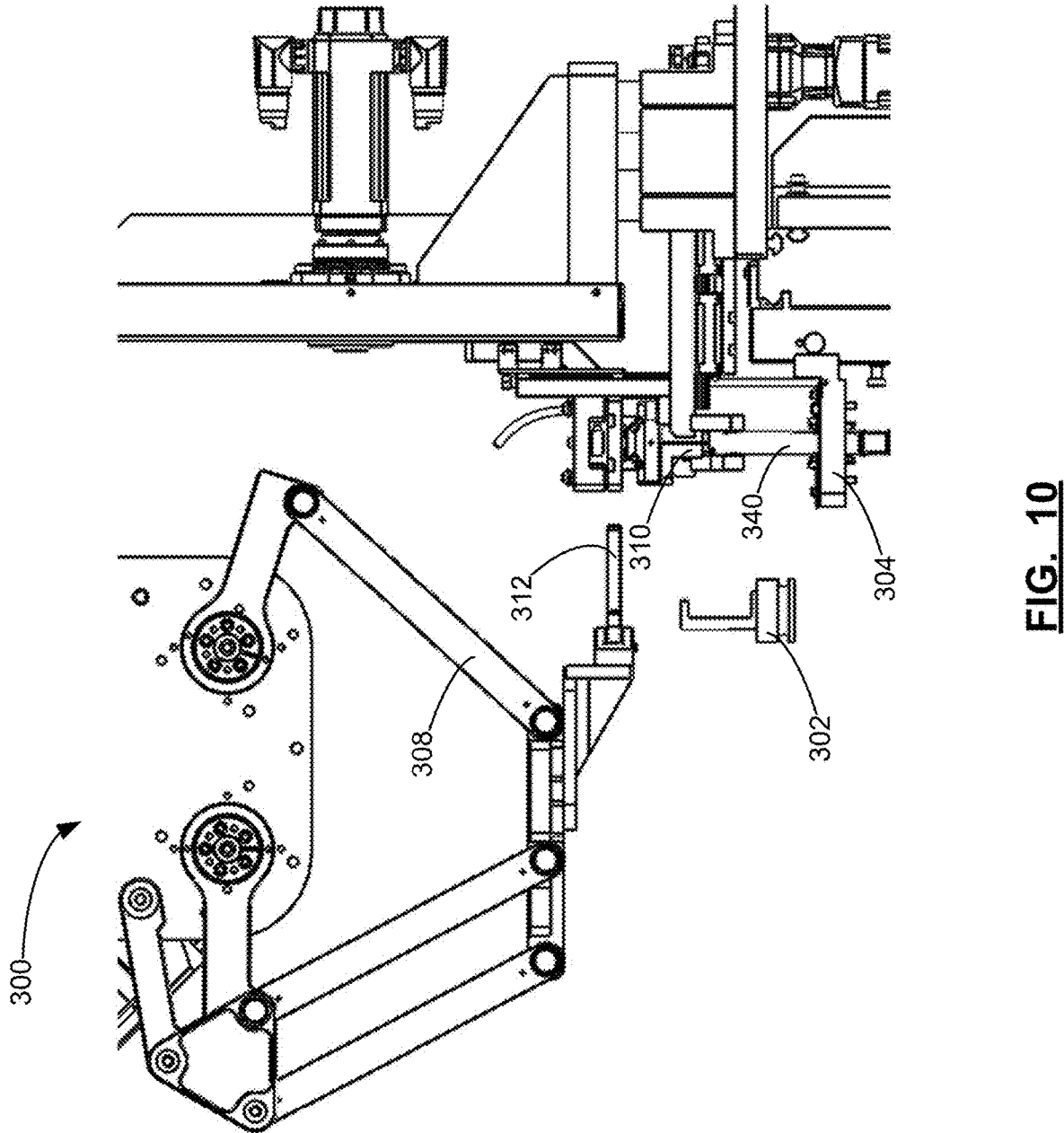

Referring to FIG. 10, in the example illustrated, the driver 310 has fully inserted the pre-filled syringe 320 into the injector body 340. Simultaneously, the arm 312 can continue to move away from the driver 310 and the pre-filled syringe 320 and prepare to engage another pre-filled syringe from a supply carrier 302. Once the pre-filled syringe 320 has been fully inserted into the injector body 340, the driver 310 retracts from the pre-filled syringe 320. The driver 310 can disengage from the pre-filled syringe 320 by retracting the inner grippers inwardly away from the inner surface of the pre-filled syringe 320. The driver 310 can, after disengaging from the pre-filled syringe 320, move vertically upward away from the pre-filled syringe 320 along vertical axis A-A.

Figure 11:
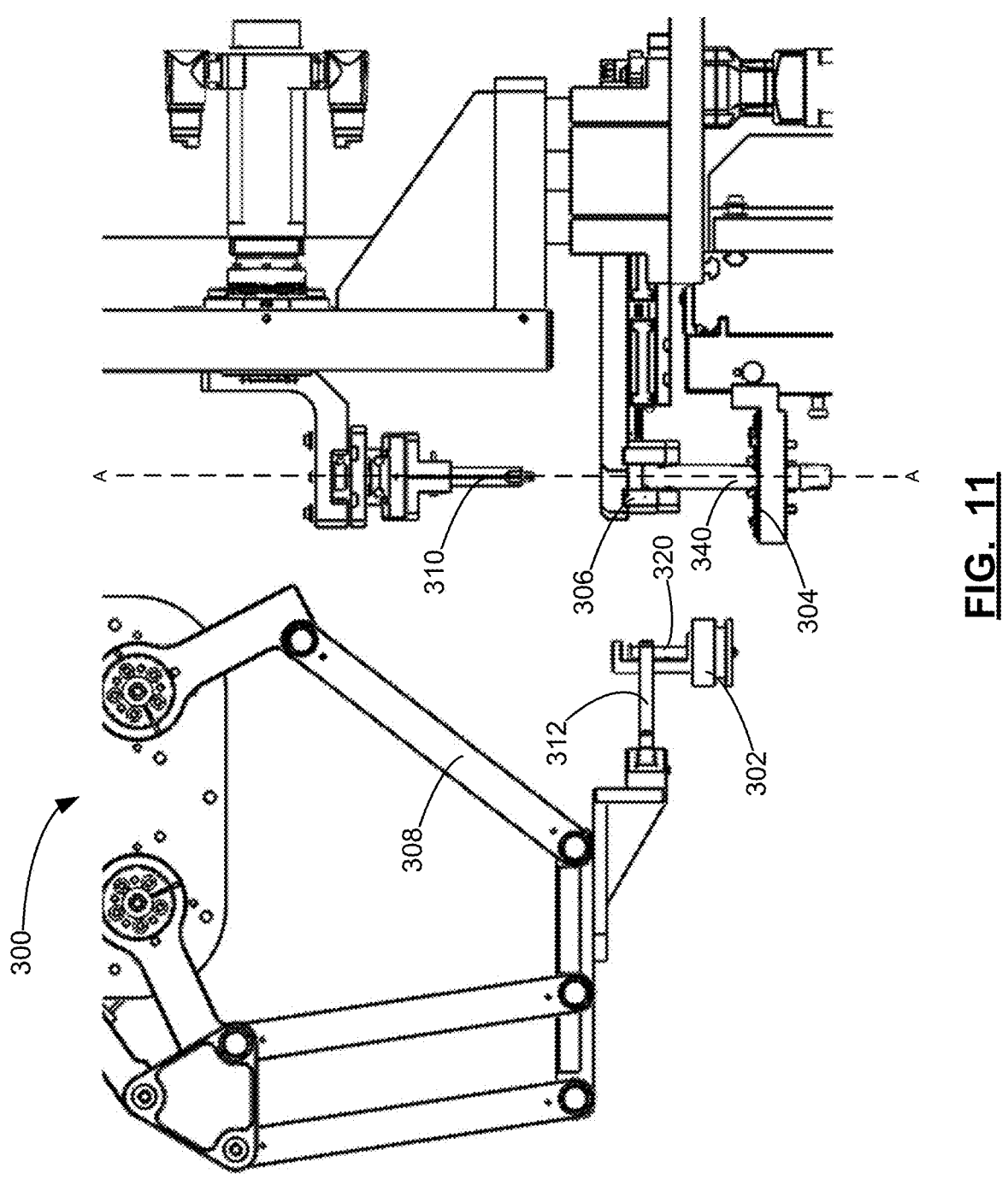

Referring to FIG. 11, in the example illustrated, the driver 310 has disengaged from the pre-filled syringe 320 and returned to initial position aligned along vertical axis A-A. In some embodiments, the injector body 340 now loaded with the pre-filled syringe 320 can be released from the receiving port 306. The injector body 340 can by moved by the transportation device 304. The injector body 340 can be moved from the receiving port 306 to another processing station or can be removed the system altogether. The supply carrier 302, now empty, can be moved from the stop position adjacent to the syringe insertion station 300.

Referring to FIG. 12, an example method 400 of inserting pre-filled syringes 320 into injector bodies 340 at the syringe insertion station 300 will now be described.

At step 402, in the example illustrated in FIGS. 4 and 5, a supply carrier 302 is advanced toward a stop position adjacent a syringe insertion station 300, the supply carrier 302 holding at least one pre-filled syringe 320 and the syringe insertion station 300 including an arm 312, a receiving port 306 and a driver 310.

At step 404, in the example illustrated in FIG. 5, a vertical axis of the driver 310 of the syringe insertion station 300 is aligned with a vertical axis of the receiving port 306 of the syringe insertion station 300 to form a vertical linear axis A-A.

At step 406, in the example illustrated in FIG. 4, an injector body 340 is advanced toward the receiving port 306 in electronic synchronization with advancement of the supply carrier 302 to the stop position.

At step 408, in the example illustrated in FIGS. 6 and 7, the at least one pre-filled syringe 320 is moved, by the arm 312, from the supply carrier 302 to the vertical linear axis of the receiving port 306 of the syringe insertion station 300, wherein the arm 312 engages an outer surface of the pre-filled syringe 320. The arm 312 can engage the pre-filled syringe 320 on an outer diameter of the pre-filled syringe 320, the outer diameter including a first outer point of the outer surface and a second outer point of the outer surface, the first outer point diametrically opposed from the second outer point. Prior to moving the pre-filled syringe 320 to the receiving port 306 of the syringe insertion station 300, the at least one pre-filled syringe 320 can be moved vertically from the supply carrier 302 a distance greater than a length of the pre-filled syringe 320. The supply carrier 302, after moving the pre-filled syringe 320, can be advanced from the stop position.

At step 410, in the example illustrated in FIGS. 8 to 10, while the arm 312 is in engagement with the pre-filled syringe 320, applying a downward force by the driver 310 along the vertical linear axis to direct the pre-filled syringe 320 into the injector body 340, wherein the driver 310 engages an inner surface of the pre-filled syringe 320. The driver 310 can engage the pre-filled syringe 320 on an inner diameter of the pre-filled syringe 320, the inner diameter including a first inner point of the inner surface and a second inner point of the inner surface, the first inner point diametrically opposed from the second inner point.

At step 412, in the example illustrated in FIGS. 9 to 11, retracting the arm 312 from the pre-filled syringe 320. The retraction of the arm 312 can involve disengaging the pre-filled syringe 320 and retracting the arm 312 away from the vertical linear axis. Retracting the arm 312 can occur simultaneously with the driver 310 inserting the pre-filled syringe 320 into the injector body 340.

At step 414, in the example illustrated in FIG. 11, retracting the driver 310 from the pre-filled syringe 320. The retraction of the driver 310 can involve disengaging the pre-filled syringe 320 and moving the driver 310 away from the pre-filled syringe 320 along the vertical linear axis.

The method can further involve, after the pre-filled syringe 320 is loaded into the injector body 340, releasing the injector body 340 from the receiving port 306. The method can be repeated for a plurality of subsequent supply carriers 302. This method can be further carried out on a second syringe insertion station simultaneously to the method being carried out on the syringe insertion station 300.

The process is repeated continuously for each pre-filled syringe 320 and injector body 340 to install the pre-filled syringes 320 in a continuous mass production process. During advancement of a first supply carrier 302 to the stop position, a second supply carrier can be advanced to a stop position for a second syringe insertion station for loading therein. The above method can be repeated on the second syringe insertion station simultaneously to the method on the syringe insertion station 300 to complete the installation of the second pre-filled syringe into a second injector body.

The invention claimed is:

1. A method for processing syringes in an automated mass production process, comprising:
   a) advancing a supply carrier toward a stop position adjacent a syringe insertion station, the supply carrier holding at least one pre-filled syringe, and wherein the syringe insertion station includes an arm, a receiving port, and a driver in alignment with the receiving port along a vertical axis;
   b) receiving an injector body in the receiving port in alignment with the vertical axis, the receiving in (b) including advancing the injector body toward the receiving port in electronic synchronization with advancement of the supply carrier toward the stop position during (a);
   c) moving, by the arm, the at least one pre-filled syringe from the supply carrier and into alignment with the receiving port and the driver along the vertical axis, wherein the arm engages an outer surface of the pre-filled syringe during the moving in (c);
   d) while the arm is in engagement with the pre-filled syringe and the pre-filled syringe is in alignment with the driver and the receiving port along the vertical axis, applying a downward force by the driver to direct the pre-filled syringe into the injector body received in the receiving port during (b), wherein the driver engages an inner surface of the pre-filled syringe during the applying the downward force in (d);
   e) retracting the arm from the pre-filled syringe; and
   f) retracting the driver from the pre-filled syringe.

2. The method of claim 1, wherein the arm engages the pre-filled syringe on an outer diameter of the pre-filled syringe, the outer diameter including a first outer point of the outer surface and a second outer point of the outer surface, the first outer point diametrically opposed from the second outer point.

3. The method of claim 1, wherein the driver engages the pre-filled syringe on an inner diameter of the pre-filled syringe, the inner diameter including a first inner point of the inner surface and a second inner point of the inner surface, the first inner point diametrically opposed from the second inner point.

4. The method of claim 1, wherein the arm remains in engagement with the pre-filled syringe during at least an initial application of the downward force by the drive during (d), with the arm moving downward in synchronicity with the driver during the initial application of the downward force.

5. The method of claim 1, wherein retracting the arm in e) comprises disengaging the pre-filled syringe and retracting the arm horizontally away from the pre-filled syringe.

6. The method of claim 5, wherein retracting of the arm in e) occurs simultaneously with the driver inserting the pre-filled syringe into the injector body.

7. The method of claim 1, wherein retracting the driver in f) comprises disengaging the pre-filled syringe and moving the driver upwardly away from the pre-filled syringe.

8. The method of claim 1, further comprising: g) after the pre-filled syringe is loaded into the injector body, releasing the injector body from the receiving port.

9. The method of claim 8, further comprising: h), after c), advancing the supply carrier away from the stop position.

10. The method of claim 9, further comprising repeating a) to h) for a plurality of subsequent supply carriers.

11. The method of claim 10, wherein a second supply carrier is advanced towards a second stop position adjacent a second syringe insertion station and a second method is carried out simultaneously on the second syringe insertion station.

12. A method for inserting elongated workpieces in receiving assemblies in an automated mass production process, comprising:
   a) advancing a supply carrier toward a stop position adjacent an insertion station, the supply carrier holding at least one elongated workpiece, and wherein the insertion station includes an arm, a receiving port, and a driver in alignment with the receiving port along a vertical axis;
   b) receiving a receiving assembly in the receiving port in alignment with the vertical axis, the receiving in (b) including advancing the receiving assembly toward the receiving port in electronic synchronization with advancement of the supply carrier toward the stop position during (a);
   c) moving, by the arm, the at least one elongated workpiece from the supply carrier and into alignment with the receiving port and the driver along the vertical axis, wherein the arm engages an outer surface of the elongated workpiece during the moving in (c);

d) while the arm is in engagement with the elongated workpiece and the elongated workpiece is in alignment with the receiving port and the driver along the vertical axis, applying a downward force by the driver to direct the elongated workpiece into the receiving assembly received in the receiving port during (b), wherein the driver engages an inner surface of the elongated workpiece during the applying the downward force in (d);

e) retracting the arm from the elongated workpiece; and f) retracting the driver from the elongated workpiece.

13. The method of claim 12, wherein the elongated workpiece is a pre-filled syringe.

14. The method of claim 12, wherein the receiving assembly is an injector body.

15. An automated mass production system, comprising:

a) a plurality of supply carriers, each supply carrier configured to hold at least one elongated workpiece and advanceable through a stop position;

b) an insertion station adjacent the stop position, the insertion station including an arm, a receiving port configured to support a receiving assembly, and a driver in alignment with the receiving port along a vertical axis; and c) a control system configured to synchronize operation of the supply carriers and the insertion station to perform the method of claim 12.

16. The method of claim 12, wherein the arm engages the elongated workpiece on an outer diameter of the elongated workpiece, the outer diameter including a first outer point of the outer surface and a second outer point of the outer surface, the first outer point diametrically opposed from the second outer point.

17. The method of claim 12, wherein the driver engages the elongated workpiece on an inner diameter of the elongated workpiece, the inner diameter including a first inner point of the inner surface and a second inner point of the inner surface, the first inner point diametrically opposed from the second inner point.

18. The method of claim 12, wherein the arm remains in engagement with the elongated workpiece during at least an initial application of the downward force by the driver during (d), with the arm moving downward in synchronicity with the driver during the initial application of the downward force.

19. The method of claim 12, wherein retracting the arm in e) comprises disengaging the elongated workpiece and retracting the arm horizontally away from the elongated workpiece.

20. The method of claim 19, wherein retracting of the arm in e) occurs simultaneously with the driver inserting the elongated workpiece into the receiving assembly.

21. The method of claim 12, wherein retracting the driver in f) comprises disengaging the elongated workpiece and moving the driver upwardly away from the elongated workpiece.

22. The method of claim 12, further comprising: g) after the elongated workpiece is loaded into the receiving assembly, releasing the receiving assembly from the receiving port.

23. The method of claim 22, further comprising: h), after c), advancing the supply carrier from the stop position.

24. The method of claim 23, further comprising repeating a) to h) for a plurality of subsequent supply carriers.

25. The method of claim 24, wherein a second supply carrier is advanced toward a second stop position adjacent a second insertion station and a second method is carried out simultaneously on the second insertion station.

* * * * *